United States Patent
Zhang et al.

[11] Patent Number: 5,390,536
[45] Date of Patent: Feb. 21, 1995

[54] APPARATUS FOR MEASURING SURFACE ROUGHNESS

[75] Inventors: Yu-Wu Zhang, Kawasaki; Masanobu Kataoka, Kure, both of Japan

[73] Assignee: Mitutoyo Corporation, Tokyo, Japan

[21] Appl. No.: 134,753

[22] Filed: Oct. 12, 1993

[30] Foreign Application Priority Data

Oct. 29, 1992 [JP] Japan .................. 4-306414
Apr. 9, 1993 [JP] Japan .................. 5-107669

[51] Int. Cl.$^6$ .............................................. G01B 5/28
[52] U.S. Cl. ................................. 73/105; 324/76.28
[58] Field of Search ............... 73/105; 324/76.28, 661

[56] References Cited

U.S. PATENT DOCUMENTS

| | | | |
|---|---|---|---|
| 3,903,735 | 9/1975 | Wilson | 73/105 |
| 4,126,036 | 11/1978 | Nilan | 73/105 |
| 4,665,739 | 5/1987 | Mizuno | 73/105 |

FOREIGN PATENT DOCUMENTS

3002185 12/1988 Germany .

OTHER PUBLICATIONS

DIN 4772, "Electrical Contact (Stylus) Instruments for the Measurement of Surface Roughness by the Profile Method", Nov. 1979, Germany.
DIN 4774, "Measurement of the Depth of Waviness by Means of Electrical Contact (Stylus) Instruments", Jul. 1981, Germany.
Tietze, et al., "Halbleiterschal Tungstechnik", 6th Ed., pp. 376, 377 and 390–398, Jan. 1983, Germany.

*Primary Examiner*—Kenneth A. Wieder
*Assistant Examiner*—Jose M. Solis
*Attorney, Agent, or Firm*—Oliff & Berridge

[57] ABSTRACT

There are provided a pickup for scanning a surface of an object to be measured and for outputting an electric signal corresponding an unfiltered profile curve; and a low-pass filter for extracting low-frequency components corresponding to a waviness profile curve from the electric signal output from the pickup. The low-pass filter comprises two cascade-connected filters expressed by transfer function G(s) having adjusting coefficient $\zeta$ which ranges from 0.7134 to 1.1083:

$$G(s)=1/\{(\alpha s/\omega c)^2+2\zeta(\alpha s/\omega c)+1\}$$

where $s=j\omega$, $\omega c$ is a cutoff frequency, and $\alpha$ is a constant.

10 Claims, 7 Drawing Sheets

APPARATUS FOR MEASURING SURFACE ROUGHNESS

BACKGROUND OF THE INVENTION

The present invention relates to a surface-roughness measuring apparatus, and more particularly to an improvement of a low-pass filter for extracting waviness-profile curve components from a detected profile curve.

A surface-roughness measuring apparatus is utilized for evaluating surface process accuracy of various machined workpieces. A stylus-type surface-roughness measuring apparatus includes a pickup comprising a stylus for tracing surface of an object to be measured and a detector for converting vibration detected by the stylus into an electric signal and amplifying the converted signal. At an output stage of the pickup provided are: an analog filter for filtering the signal from the pickup; an A/D converter for converting the filtered signal into digital data; and a data processing unit for processing the converted digital data.

An electric signal waveform detected by the pickup is referred to as an original profile curve. This original profile curve includes a waviness profile curve composed of low frequency components and a roughness curve composed of high frequency components. The roughness curve corresponds to small irregularity components constituting the surface roughness. A low-pass filter is used to obtain the waviness profile curve from the original unfiltered profile curve and a high-pass filter is used to obtain the roughness curve from the unfiltered profile curve. The roughness curve can also be obtained by subtracting the output of the low-pass filter (the waviness profile curve) from the original signal (unfiltered profile curve). The above described analog filter is used to perform the above-described filtering process. Similar filtering process can also be performed in a digital manner by the data processing unit without using the analog filter.

As described above, the roughness curve is obtained from the unfiltered profile curve by cutting the waviness profile curve components having wavelengths longer than a predetermined wavelength. The predetermined wavelength is called a cutoff value. Characteristic of low-pass filter for obtaining the waviness profile curve used for the surface roughness measuring has both domestic and international standards. These standards specify that the error between the frequency characteristic of the low-pass filter and the frequency characteristic of Gaussian filter be within a predetermined range. The Gaussian filter is a filter in which both an inpulse response of filter (a window function) and frequency characteristic exhibit the Gaussian function (a normal distribution function).

It has been known that an analog filter constituted by infinitely cascade-connected CR filters each having identical time-constant has a filter characteristic infinitely approximated to the ideal Gaussian filter.

In recent years, a digital filtering process is becoming popular in which the filtering process is performed by computer software in place of the analog filter. For example, German Patent No. 3,002,185 discloses a method for approximately realizing the Gaussian filter by cascade-connecting two finite inpulse response filters (FIR filters) each having a triangle window or a secondary infinite inpulse response filter (IIR filter).

However, the method of using ordinary IIR filters as the secondary filters has a large error. The use of the FIR filters permits the error to be reduced, but requires huge arithmetic operations, resulting in extremely increased operation time.

SUMMARY OF THE INVENTION

An object of the present invention is to provide a surface roughness measuring apparatus which permits a filtering process with a comparatively shorter operation time and a reduced error with respect to the Gaussian filter by introducing an adjusting coefficient appropriate to a transfer function of a low-pass filter.

According to a first aspect of the present invention, in a surface roughness measuring apparatus comprising pickup means for scanning the surface of an object to be measured and outputting an electric signal corresponding to an original profile curve, and low-pass filter means for extracting a low-frequency component corresponding to waviness profile curve from an output signal of the pickup means, the low-pass filter means comprises two cascade-connected filters expressed by transfer function G(s) of the following equation (1) having an adjusting coefficient $\zeta$:

$$G(s) = 1/\{(\alpha s/\omega c)^2 + 2\zeta(\alpha s/\omega c) + \} \tag{1}$$

wherein $\zeta$ falls within a range from 0.7134 to 1.1083, $s = j\omega$, $\omega c$ is a cutoff frequency and $\alpha$ is a constant.

According to the first aspect of the present invention, the adjusting coefficient $\zeta$ is preferably set within a range from 0.7760 to 0.8918. Further, the constant $\alpha$ is preferably set to satisfy the following equation (2) in order to set the absolute value of the transfer function G(s) at the cutoff frequency $\omega c$ to 0.5, i.e., to set the amplitude transfer ratio to 50%.

$$\alpha^2 = \{(2\zeta^2 - 1)^2 + 1\}^{\frac{1}{2}} - (2\zeta^2 - 1) \tag{2}$$

According to a second aspect of the present invention, in a surface roughness measuring apparatus comprising pickup means for scanning the surface of an object to be measured and outputting an electric signal corresponding to an original profile curve, and low-pass filter means for extracting a low-frequency component corresponding to waviness profile curve from an output signal of the pickup means, the low-pass filter means comprises two cascade-connected filters expressed by transfer function G(s) of the following equation (3) having two adjusting coefficients $\zeta$ and $\beta$.

$$G(s) = 1/\{(\alpha s/\omega c)^2 + 2\zeta(\alpha s/\omega c) + 1\}\{(\beta s/\omega c) + 1\} \tag{3}$$

According to the second aspect of the present invention, the adjusting coefficients are preferably within ranges of $\zeta =$ from 0.482 to 0.966 and $\beta =$ from 0.000 to 1.343, respectively. The adjusting coefficients $\zeta$ and $\beta$ have such a relation that when one of the adjusting coefficients has a large value, the other has a small value. More preferably, the adjusting coefficients $\zeta$ and $\beta$ are within ranges of $\zeta =$ from 0.632 to 0.722 and $\beta =$ from 0.789 to 0.986 and have such a relation that when one coefficient has a large value, the other has a small value. Further, the constant $\alpha$ is preferably set to satisfy the following equation (4) so as to set the absolute value of the transfer function to 0.5 at the cutoff value ($\omega = \omega c$).

$$\alpha^2 = (1-2\zeta^2) + \{(1-2\zeta^2)^2 + (1-\beta^2)/(1+\beta^2)\}^{\frac{1}{2}} \quad (4)$$

DETAILED DESCRIPTION OF THE PREFERRED EMBODIMENTS

Figure 1:
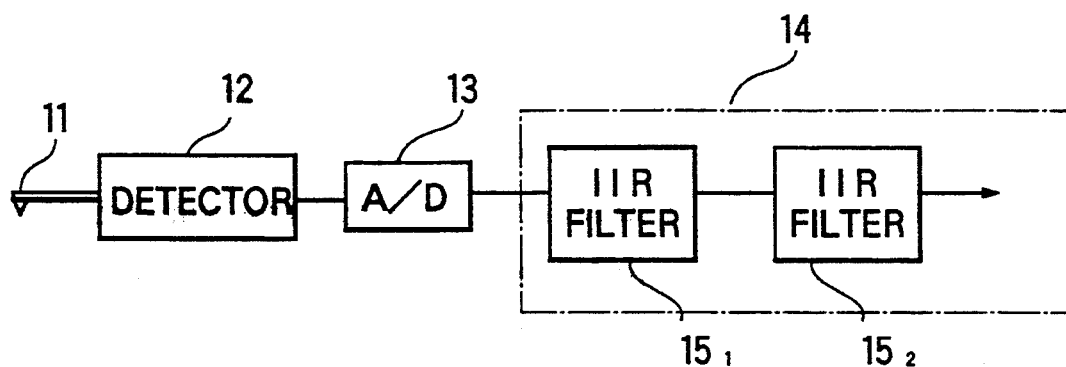
FIG. 1 shows an arrangement of a surface-roughness measuring apparatus according to a first embodiment of the present invention.

As shown in FIG. 1, the measuring apparatus according to the first embodiment is provided with a pickup constituted by a stylus 11 and a detector 12. The stylus 11 traces a surface of an object to be measured to detect vibration and the detector 12 converts the vibration detected by the stylus 11 into an electric signal and amplifies the signal. An output of the detector 12 is connected to an A/D converter which converts the input electric signal into a digital signal. The converted digital data is sent to a data processing circuit 14. The digital processing circuit 14 is constituted by a microcomputer, for example which is provided with a low-pass filter comprised of two cascade-connected IIR filters 151 and 152 constituted by software. The low-pass filter extracts waviness profile curve components from unfiltered profile curve data. Furthermore, the waviness profile curve components are subtracted from the original signal (unfiltered profile curve data) to thereby obtain a roughness curve.

Figure 2:
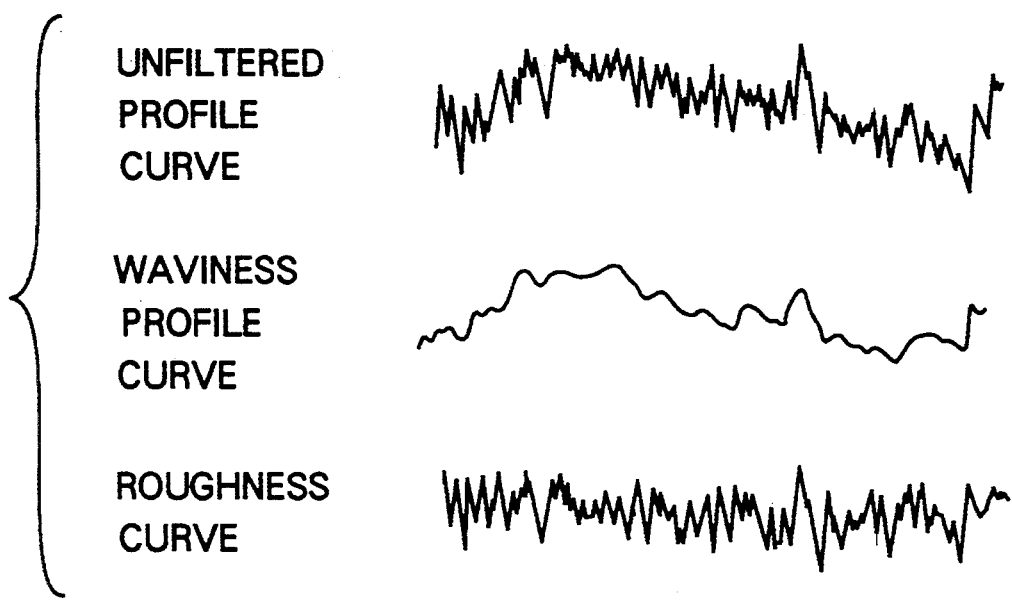
FIG. 2 is a view for explaining a principle of measuring surface roughness.

FIG. 2 shows a relation of the unfiltered profile curve obtained by the pickup, the waviness profile curve extracted by the low-pass filter, and the roughness curve obtained by subtracting the waviness profile curve from the unfiltered profile curve.

The digital-filtering process by the IIR filters 151 and 152 are same as the analog filter process represented by the transfer function introducing the adjusting coefficient $\zeta$ as shown in equation (1). Prior to the explanation of the digital process, the filter characteristic in the embodiment will now be described. When two filters each having the transfer function in which the above described adjusting coefficient $\zeta$ is introduced are cascade-connected, the absolute value of the transfer function (amplitude transfer ratio) is expressed in equation (5).

$$|G(\omega)|^2 = 1/[\{1-(\alpha\omega/\omega c)^2\}^2 + 4\zeta^2(\alpha\omega/\omega c)^2] \quad (5)$$

From this equation (5), a relation between $\alpha$ and $\zeta$ shown in equation (2) is obtained conditioned that the absolute value of the transfer function is set to 0.5 at the cutoff value $\omega = \omega c$.

Then, the transfer function expressed in equation (1) is calculated by changing the adjusting coefficient $\zeta$ variously to obtain errors between the transfer function and the Gaussian filter. The calculated data are exemplified.

Figure 4:
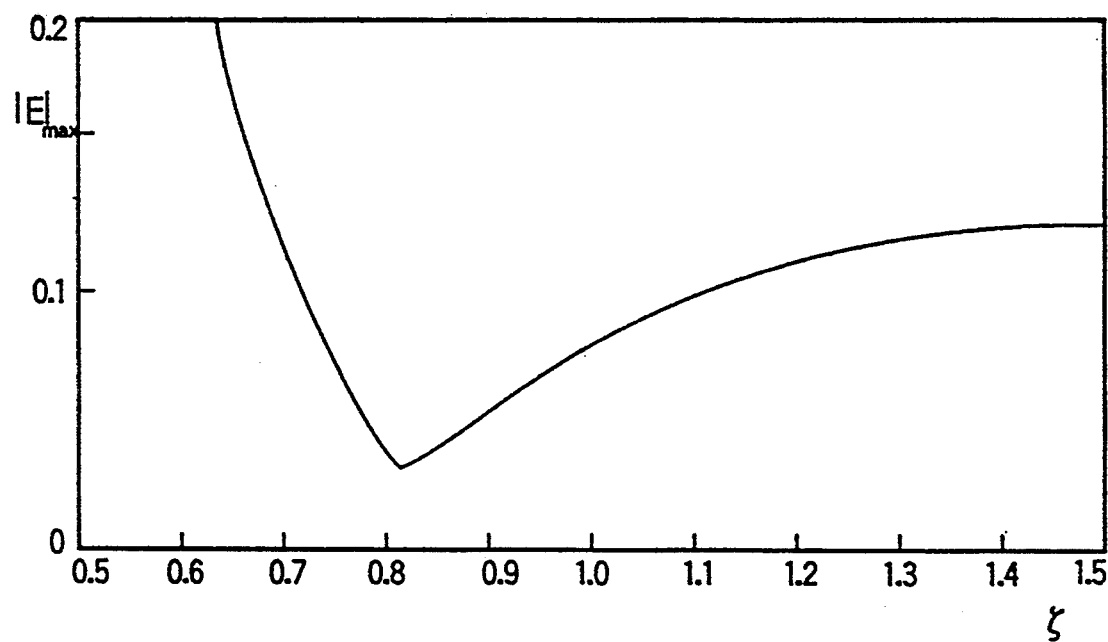
FIG. 4 shows a relation between absolute values of filter characteristic errors and adjusting coefficients in the first embodiment.

FIGS. 4 shows a relation between the error absolute error value $|E|$max and the adjusting coefficient $\zeta$. The calculation results reveal that the error is 0.05 (i.e., 5%) or less when $\zeta$ is in a range from 0.7760 to 0.8918. Further, the error is 0.10 (i.e., 10%) or less when $\zeta$ is within a range from 0.7134 to 1.1083. Further, the minimum error 0.029065 is obtained when $\zeta = 0.8133$.

When the adjusting coefficient $\zeta$ is selected as mentioned above, the coefficient for constructing the filter represented by this transfer function by the analog filter is as follows:

If, driving velocity: v = 0.5 mm/sec
cutoff value (wavelength): $\lambda c = 0.8$ mm
amplitude transfer rate at the cutoff value: 50%
number of sampling points per cutoff value: 1000
are given
then,
cutoff frequency: fc = 0.625 Hz
sampling interval: 1.6 msec are obtained.

Figure 3:
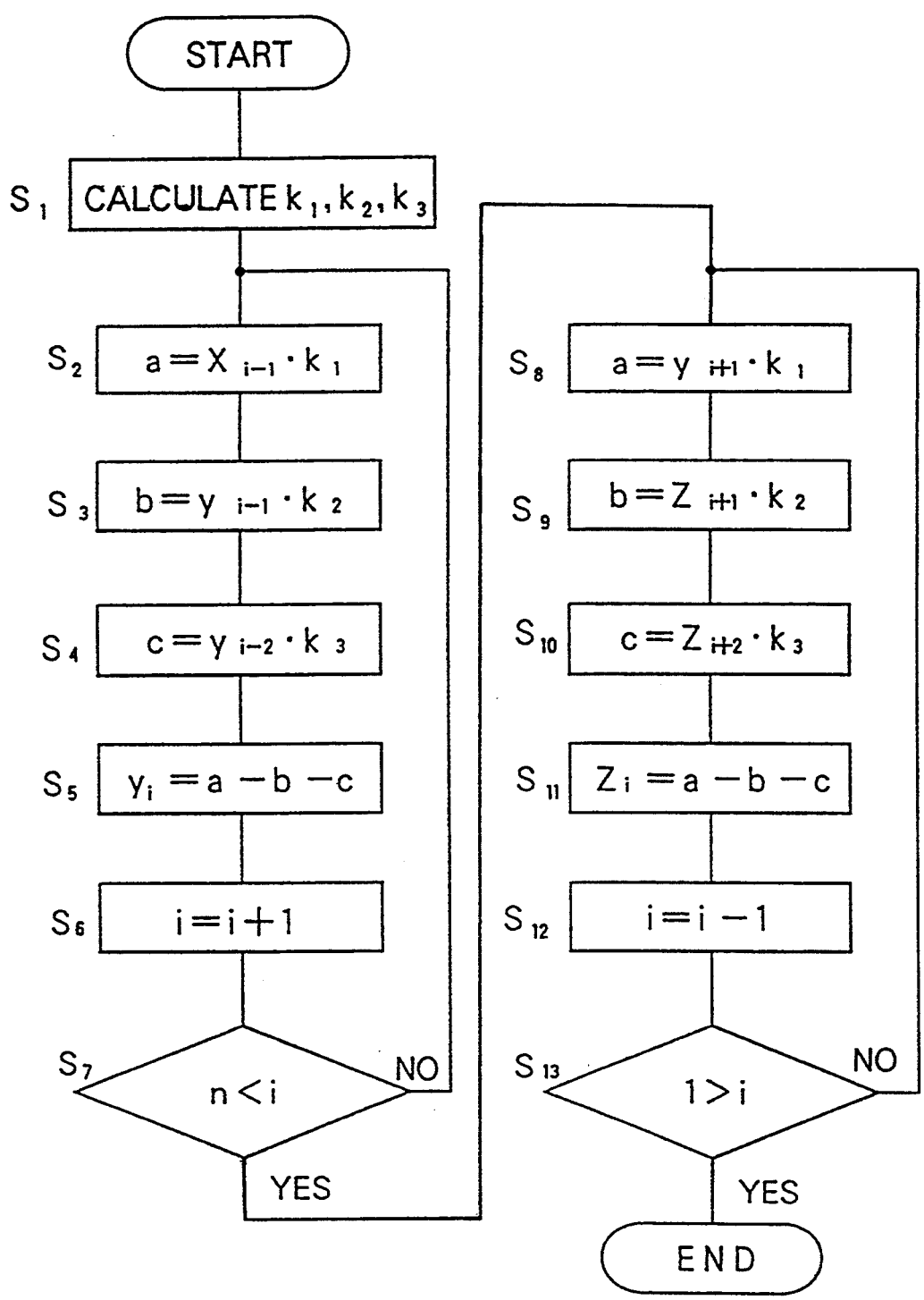
FIG. 3 is a flowchart of the filtering process in the first embodiment.

If the transfer function of the analog filter is expressed by $G(s) = G/(s^2 + b1 \cdot s + b0)$, the coefficients G, b1 and b0 will be as follows:

$G = \omega c^2/\alpha^2 = 22.22827993$ $b1 = \omega c/\alpha = 7.8150663$ $b0 = \omega c^2/\alpha^2 = 22.22827993$ According to the first embodiment, the analog low-pass filter designed as described above is implemented by software in a digital manner as described above. The filtering process is shown in the flowchart of FIG. 3. If the low-pass filter is approximated by a recursive type digital filter (IIR filter), the equation will be as follows:

$$y/x = G(a0 + a1z^{-1} + a2\, z^{-2})/(b0 + b1\, z^{-1} + b2\, z^2) \quad (6)$$

where x and y are input and output data of the filter, respectively. Furthermore, $z^{-1} \cdot x$ indicates "x" preceded by "i" items of data. G, a0, a1, a2, b0, b1, and b2 are constant.

The coefficients of the digital filter can be obtained as follows from the coefficients of the analog filter by input inpulse invariance.

$a0 = 0$ $a1 = 1.590023199$ $a2 = 0$ $b0 = 1.0$ $b1 = -1.987517195$ $b2 = 9.87573745$ $G = 3.55641654$

As mentioned above, since $a0=a2=0$, the equation (7) can be introduced from the equation (6).

$$y_i = G \cdot a1 \cdot x_{i-1} - b1 \cdot y_{i-1} \, b2 \cdot y_{i-2} \quad (7)$$

The steps S1 through S7 in FIG. 3 correspond to the process of the IIR filter 151 in the first stage in which the input data of n data items is represented by x and the intermediate output data is represented by y. In the step S1, the coefficient k1 ($=G \cdot a1$), k2 ($=b1$), and k3 ($=b2$) are calculated. In steps S2 through S4, the first through third terms in the right side of the equation (7) are calculated. In the step S5, the intermediate output data $y_i$ is obtained from the equation (7). The above steps are repetitively and sequentially executed with respect to n items of data (S7) in the ascending order.

The steps S8 through S13 correspond to the process of the IIR filter 152 in the second stage. Then, the obtained data is calculated in the reverse order this time in accordance with the equation (7) to obtain the output data sequence $z_i$. This output data sequence $z_i$ serves as the phase-compensated low-pass filter output.

As a result of the low-pass filtering processes by the IIR filter 151 in the first stage and the IIR filter 152 in the second stage, the waviness profile curve is obtained. Furthermore, by subtracting the low-pass filter output from the original data by the data processing circuit 14, the phase-compensated high-pass filtering process is performed to thereby obtain the surface roughness.

In the above embodiment, the digital filter is constructed where the two-stage secondary filters are implemented by software. However, the present invention is not limited to the above embodiment. For example, the two-stage secondary filters represented by the above-described transfer function can be constructed by hardware in digital manner or analog manner. Such embodiment will now be described.

Figure 5:
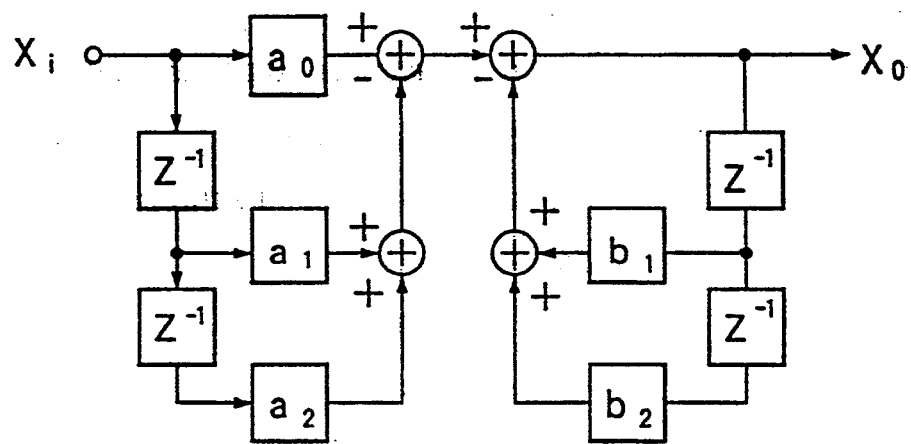
FIG. 5 shows a digital filter according to a second embodiment of the present invention.

FIG. 5 shows an arrangement of a digital filter utilizing bilinear transformation according to a second embodiment of the present invention. This digital filter comprises a delay circuit indicated by $z^{-1}$, weighting circuits indicated by a0, a1, a2, b1, and b2, and adders/subtracters. If the cutoff wavelength and the sampling interval are represented by $\lambda c$ and $\lambda s$, respectively, each weighting coefficients can be represented as follows by introducing the adjusting coefficient $\zeta$.

Figure 6:
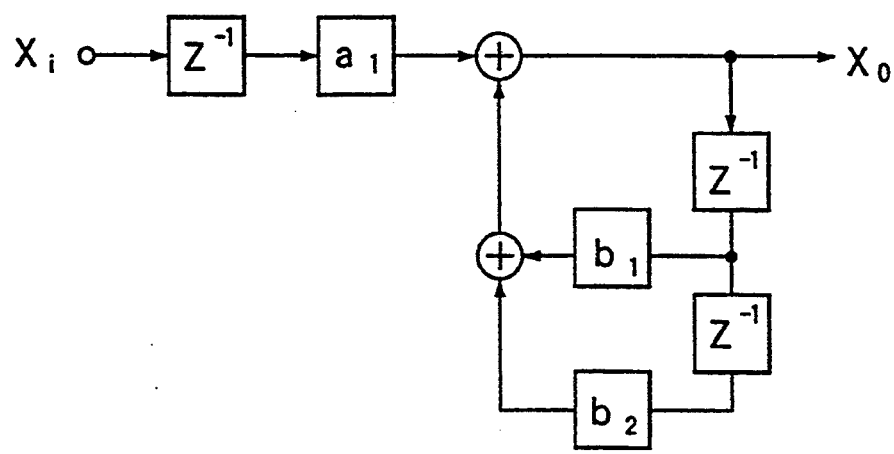
FIG. 6 shows a digital filter according to a third embodiment of the present invention.

$a0 = \lambda^2/A$ $a1 = 2a0$ $a2 = a0$ $b1 = \{2\lambda s^2 - 2(2\alpha\lambda c)^2\}/A$ $b2 = \{\lambda s^2 - 4\zeta\alpha\lambda c\lambda s + (2\alpha\lambda c)^2\}/A$ where $A = \lambda s^2 + 4\zeta\alpha\lambda c\lambda s + (2\alpha\lambda c)^2$ FIG. 6 shows an arrangement of a digital filter utilizing impulse response invariance transformation according to a third embodiment of the present invention.

In this embodiment, the weighting coefficients in each weighting circuits are represented as follows when the adjusting coefficient is $\zeta \leq 1$.

Figure 7:
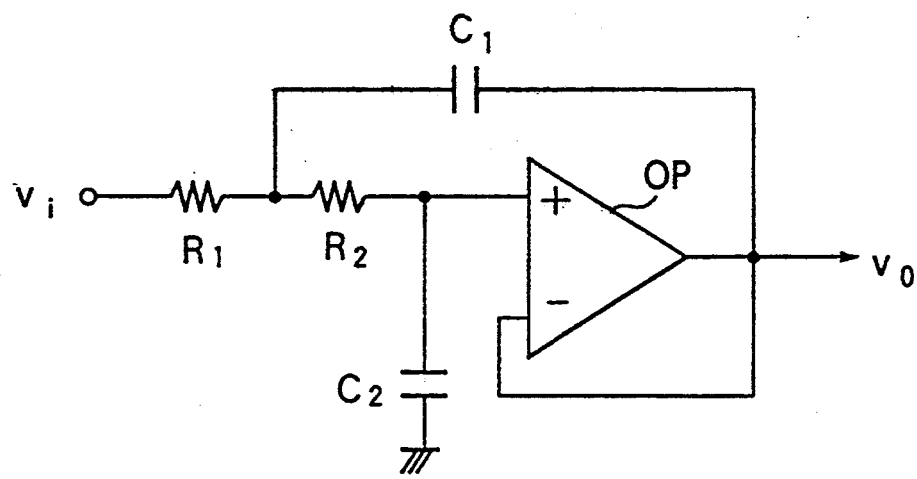
FIG. 7 shows an analog filter according to a fourth embodiment of the present invention.

$a1 = 1 + b1 + b2$ $b1 = -2exp(-\zeta\lambda s/\alpha\lambda\omega c) \cdot \cos\{(1-\zeta^2)^{\frac{1}{2}}\lambda s/\alpha\lambda c\}$ $b2 = exp(-2\zeta\lambda s/\alpha\lambda c)$ FIG. 7 shows an arrangement of the low-pass filter constructed by the CR analog circuit according to a fourth embodiment of the present invention. The values of the resistors and the capacitors are set as follows by introducing the adjusting coefficient $\zeta$.

$R1 = R2 = R$ (appropriate value)

$C1 = (\alpha\lambda c)/(\zeta R)$ $C2 = (\zeta\lambda c)/(\alpha R)$

Figure 8:
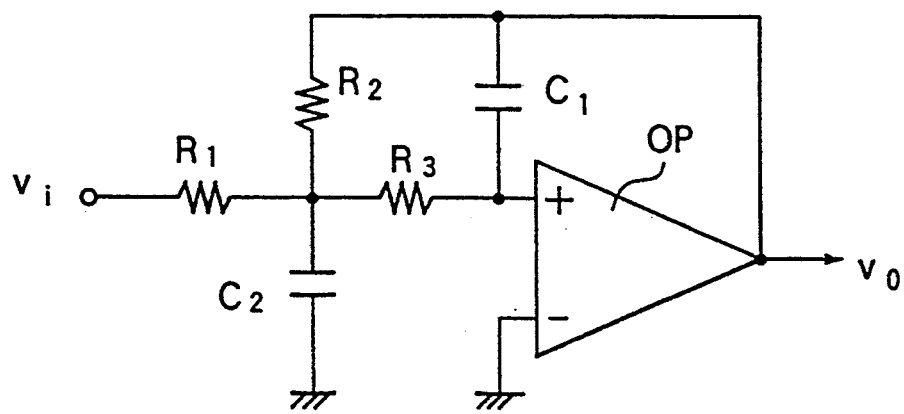
FIG. 8 shows an analog filter according to a fifth embodiment of the present invention.

FIG. 8 shows an arrangement of a low-pass filter according to a fifth embodiment of the present invention. In this embodiment, the values of the resistors and the capacitors are set as follows:

$R1 = R2 = R3 = R$ (appropriate value)

$C1 = (2\zeta\lambda c)/(3\alpha R)$ $C2 = (3\alpha\lambda c)/(2\zeta R)$

Figure 9:
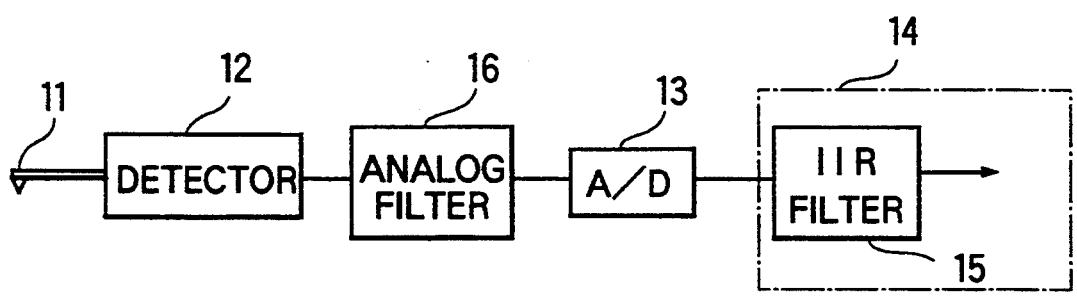
FIG. 9 shows an arrangement of a surface-roughness measuring apparatus according to a sixth embodiment of the present invention.

According to the present invention, the two secondary filters constituting the low-pass filter can also be constructed by a combination of the analog filter and the digital filter. FIG. 9 shows such an arrangement according to a sixth embodiment of the present invention. As shown in FIG. 9, the secondary filter in the first stage is constituted by an analog filter 16 and is placed in the upstream of an A/D converter 13. The secondary filter in the second stage is constructed as the IIR filter 15 within the digital processing circuit 14. In this case, the adjusting coefficients of the first and second filters are identical each other, but they may be changed each other.

According to the first through sixth embodiments of the present invention, the introduction of the optimal adjusting coefficient $\zeta$ in the transfer function of the secondary filters to be arranged in two stages permits a low-pass filtering process which can constrain the error from the Gaussian filter to a very small value. Particularly, if the low-pass filter having the transfer function expressed by the equation (1) is implemented by the IIR filter, the filtering process can be performed at a shorter time and with small error from the Gaussian filter.

In the above embodiments, a quaternary filter is constructed by cascade-connecting the secondary filter in two stages. A seventh embodiment which can further reduce the error will now be described. In the seventh embodiment, the low-pass filter is constructed as a sixth-order filter by using two third-order filters in which two adjusting coefficients are introduced. The fundamental arrangement of the apparatus is the same as that shown in FIG. 1. The digital filtering process by the IIR filters 151 and 152 is the same as that of the analog filter represented by the transfer function in which the adjusting coefficients $\zeta$ and $\beta$ as shown in equation (3). When such filters having the transfer function in which the adjusting coefficients $\zeta$ and $\beta$ are introduced are cascade-connected in two stages, the absolute value of the transfer function (amplitude transfer rate) is expressed by equation (8).

$$|G(\omega)|^2 = 1/\{(1-(\alpha\omega/\omega c)^2)^2 + 4\zeta^2(\alpha\omega/\omega c)^2\}\{1+(\beta\omega/\omega c)^2\} \quad (8)$$

From the equation (8), the relation among $\alpha$, $\zeta$, and $\beta$ shown in the equation (4) is obtained as the condition that the absolute value of the transfer function is 0.5 at the cutoff value $\omega c$.

By calculating the transfer function of the equation (3) by variously changing the adjusting coefficients $\zeta$ and $\beta$, the error of the transfer function from the Gaussian filter is obtained. The calculation result is shown in more detail.

Figure 11:
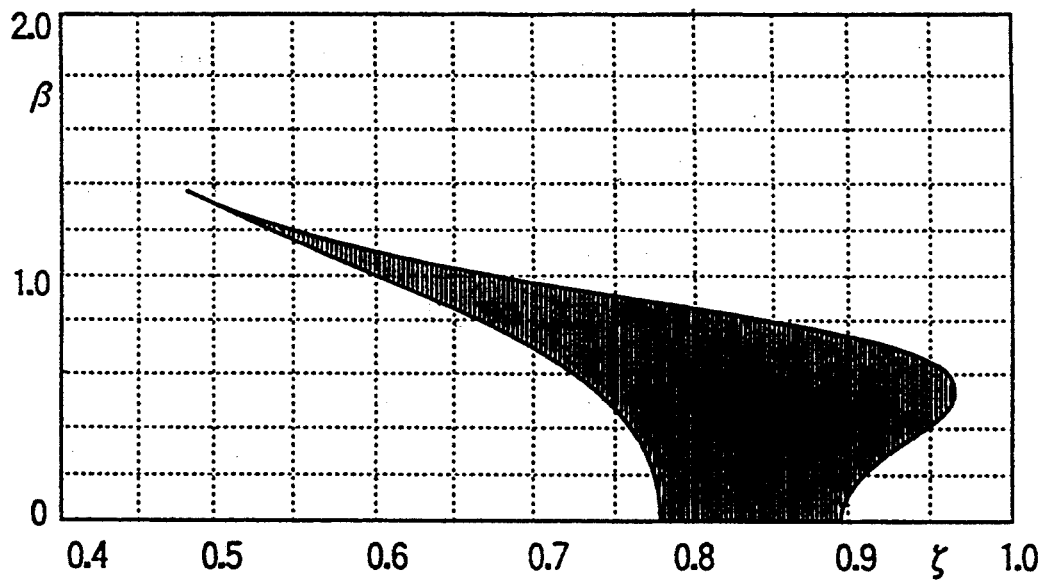
FIG. 11 shows a setting range of the adjusting coefficient for setting the filter characteristic error to 5% or less in the seventh embodiment.

The hatched portion in FIG. 11 shows the ranges of the adjusting coefficients $\zeta$ and $\beta$ which renders the maximum error from the Gaussian filter to be 0.05 (5%) or less. More specifically, the error can be constrained to 5% or less by selecting the adjusting coefficients $\zeta$ and $\beta$ such that when one coefficient has a large value, the other has a small value under the condition that $\zeta$ falls within a range from 0.482 to 0.966 and $\beta$ falls within a range from 0.000 to 1.343.

Figure 12:
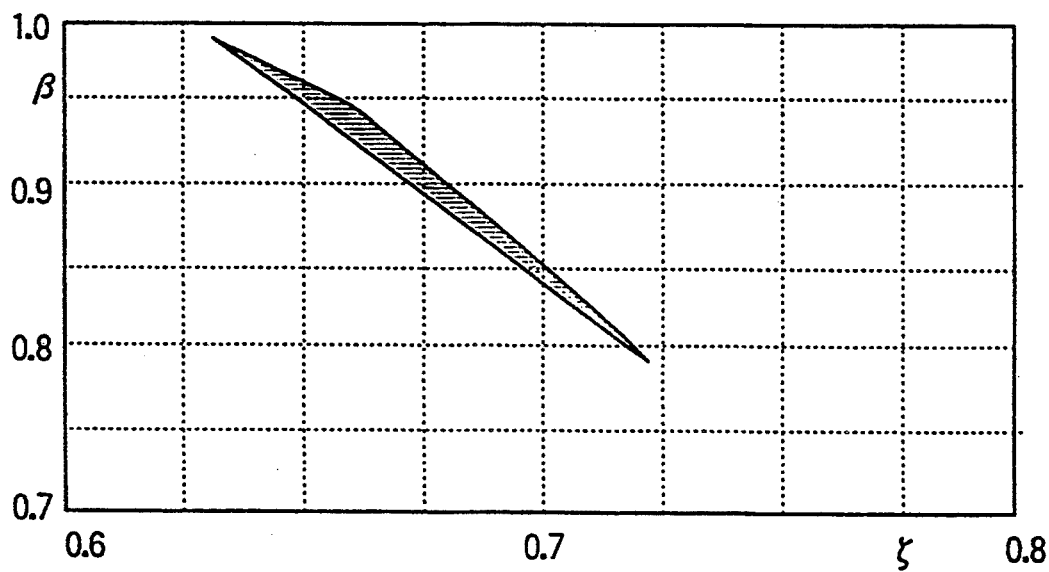
FIG. 12 shows a setting range of the adjusting coefficient for setting the filter characteristic error to 1% or less in the seventh embodiment.

The hatched portion in FIG. 12 shows ranges of the adjusting coefficients $\zeta$ and $\beta$ which constrain the maximum error from the Gaussian filter is 1% or less. More specifically, the error can be constrained to 1% or less by selecting the adjusting coefficients $\zeta$ and $\beta$ such that when one coefficient has a large value, the other has a small value under the condition that $\zeta$ falls within a range from 0.632 to 0.722 and $\beta$ falls within a range from 0.789 to 0.986.

More specifically, when $\zeta = 0.650$ and $\beta = 0.951$, the maximum error indicates the minimum value of 0.75%.

When the adjusting coefficients $\zeta$ and $\beta$ and the constant $\alpha$ are selected as described above, the coefficients for constructing the filter represented by this transfer function by the analog filter are obtained. The analog low-pass filter thus designed is implemented by software in a digital manner in this embodiment. More specifically, the transfer function of the analog filter represented by the equation (3) is converted into the transfer function of the digital IIR filter as shown in the equation (9) by utilizing a known discretion method such as the adaptive Z-transformation.

$$G(z) = a0/(1+b11z^{-1}+b12z^{-2})(1+b21z^{-1}) = a0/(1+b1z^{-1}+b2z^{-2}+b3z^{-3}) \quad (9)$$

$b11 = -2 \exp(-\zeta\omega c\, Ts/\alpha) \cos\{(1-\zeta^2)^{\frac{1}{2}}\omega c\, Ts/\alpha\}$ $b12 = \exp(-2\omega c\, Ts/\alpha)$ $b21 = -\exp(-\omega c\, Ts/\alpha)$ $a0 = (1+b11+b12)(1+b21)$ $b1 = b11+b21$ $b2 = b12+b11b21$ $b3 = b12b21$ In the equation (9), Ts is a sampling period and $Ts = \omega c/(v \cdot m)$ where $\omega c$ is the cutoff wavelength, v is a driving velocity, and m is a number of sampling points per the cutoff wavelength. The coefficients a0, b1, b2, and b3 of the digital IIR filter can be calculated by substituting the cutoff angular frequency $\omega c$, sampling period Ts, the adjusting coefficients $\zeta$, $\beta$, and the constant $\alpha$.

Figure 10:
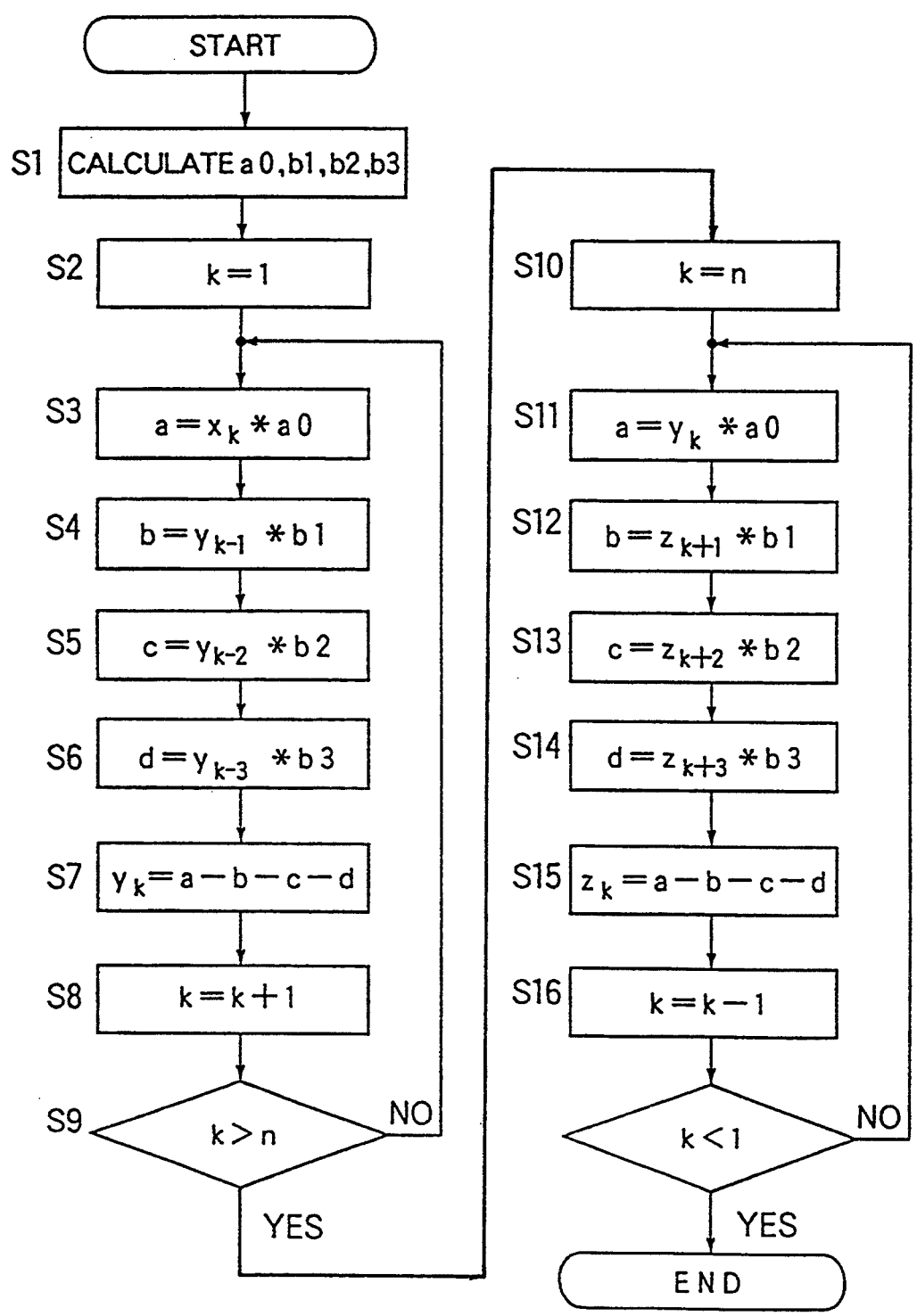
FIG. 10 is a flowchart showing a filtering process according to a seventh embodiment of the present invention.

FIG. 10 shows the process flow in this embodiment, when x, y, and z are assumed to be the unfiltered profile curve, the intermediate result, and the waviness profile curve, respectively. In FIG. 10, the steps S1 through S9 correspond to the process of the IIR filter 151 in the first stage. In step S1, the coefficients a0, b1, b2, and b3 are calculated. In the step S2, the index k is initialized. In the steps S3 through S7, the equation (9) is calculated to obtain the intermediate result y. The above process is repetitively performed with respect to n items of data in ascending order from the first data of the unfiltered profile curve (S8, S9).

The steps S10 through S17 correspond to the process of the IIR filter 152 in the second stage. The same process is performed with respect to the intermediate result y in the descending order this time in accordance with the equation (9) to thereby obtain the waviness profile curve Z.

Then, the surface roughness curve is obtained by subtracting the above obtained waviness profile curve z from the original data x (unfiltered profile curve) by the data processing section 14.

According to this embodiment, the low-pass filter characteristic having lesser error from the Gaussian filter can be obtained by introducing the two adjusting coefficients. Accordingly, the use of this low-pass filter permits the surface-roughness measurement at high accuracy.

What is claimed is:

1. A surface-roughness measuring apparatus, comprising:
   pickup means for scanning a surface of an object to be measured and for outputting an electric signal corresponding to an unfiltered profile curve; and
   a data processing circuit comprising low-pass filter means for extracting low-frequency components corresponding to a wariness profile curve from the electric signal output from the pickup means, the low-pass filter means comprising two cascade-connected filters expressed by a transfer function G(s) having an adjusting coefficient $\zeta$:

$$G(s) = 1/\{(\alpha s/\omega c)^2 + 2\zeta(\alpha s/\omega c) + 1\}$$

where $s = j\omega$, $\omega c$ is a cutoff frequency, $\zeta$ falls within a range from 0.7134 to 1.1083 and $\alpha$ is a constant;
   wherein the data processing circuit subtracts the low-frequency components from the electric signal corresponding to the unfiltered profile curve to produce a roughness curve, the roughness curve representing a surface roughness of the object measured.

2. The apparatus according to claim 1, wherein the adjusting coefficient $\zeta$ ranges from 0.7760 to 0.8918.

3. The apparatus according to claim 1, wherein the constant $\alpha$ is set so as to satisfy the following equation:

$$\alpha^2 = \{(2\zeta^2-1)^2+1\}^{\frac{1}{2}} - (2\zeta^2-1).$$

4. The apparatus according to claim 1, wherein each of the two cascade-connected filters is a digital filter.

5. The apparatus according to claim 1, wherein each of the two cascade-connected filters is an analog filter.

6. The apparatus according to claim 1, wherein a first filter of the two cascade-connected filters is an analog filter and a second filter of the two cascade-connected filters is a digital filter.

7. A surface-roughness measuring apparatus, comprising:

pickup means for scanning a surface of an object to be measured and for outputting an electric signal corresponding to an unfiltered profile curve; and a data processing circuit comprising low-pass filter means for extracting low-frequency components corresponding to a waviness profile curve from the electric signal output from the pickup means, the low-pass filter means comprising two cascade-connected filters expressed by transfer function $G(s)$ having adjusting coefficients $\zeta$ and $\beta$:

$$G(s) = 1/\{(\alpha s/\omega c)^2 + 2\zeta(\alpha s/\omega c) + 1\}\{(\beta s/\omega c) + 1\}$$

where $s = j\omega$, $\omega c$ is a cutoff frequency, and $\alpha$ is a constant;

wherein the data processing circuit subtracts the low-frequency components from the electric signal corresponding to the unfiltered profile curve to produce a roughness curve, the roughness curve representing a surface roughness of the object measured.

8. The apparatus according to claim 7, wherein the adjusting coefficients $\zeta$ ranges from 0.482 to 0.966 and $\beta$ ranges from 0.000 to 1.343.

9. The apparatus according to claim 7, wherein the adjusting coefficients $\zeta$ ranges from 0.632 to 0.722 and $\beta$ ranges from 0.789 to 0.986.

10. The apparatus according to claim 7, wherein the constant $\alpha$ is set so as to satisfy the following equation:

$$\alpha^2 = (1 - 2\zeta^2) + \{(1 - 2\zeta^2)^2 + (1 - \beta^2)/(1 + \beta^2)\}^{\frac{1}{2}}.$$

* * * * *